(12) United States Patent
McCormick (10) Patent No.: US 9,886,455 B1
(45) Date of Patent: Feb. 6, 2018

(54) DIGITAL DATA PROCESSING SYSTEMS AND METHODS FOR SEARCHING ACROSS USER ACCOUNTS

(75) Inventor: Kent McCormick, San Ramon, CA (US)

(73) Assignee: Lattice Engines, Inc., San Mateo, CA (US)

(*) Notice: Subject to any disclaimer, the term of this patent is extended or adjusted under 35 U.S.C. 154(b) by 495 days.

(21) Appl. No.: 13/525,256

(22) Filed: Jun. 15, 2012

Related U.S. Application Data (63) Continuation-in-part of application No. 13/346,371, filed on Jan. 9, 2012.

(60) Provisional application No. 61/443,679, filed on Feb. 16, 2011.

(51) Int. Cl.
*G06F 15/16* (2006.01)
*G06F 17/30* (2006.01)
*H04L 29/06* (2006.01)

(52) U.S. Cl.
CPC ........ *G06F 17/30283* (2013.01); *H04L 63/10* (2013.01)

(58) Field of Classification Search
CPC ......... G06F 17/30864; G06F 17/30867; G06F 17/2247; G06Q 30/02; G06Q 50/01; G06Q 30/0256; G06Q 30/0269
USPC .... 707/732, 706, 713, 722, 726, 3; 709/204, 709/217; 705/319
See application file for complete search history.

(56) References Cited

U.S. PATENT DOCUMENTS

| | | |
|---|---|---|
| 6,338,138 B1 | 1/2002 | Raduchel et al. |
| 6,980,982 B1 | 12/2005 | Geddes, Jr. et al. |
| 7,254,641 B2 | 8/2007 | Broughton et al. |
| 7,359,894 B1 * | 4/2008 | Liebman ........... G06F 17/30867 |
| 7,568,001 B2 | 7/2009 | McPartlan et al. |
| 7,580,862 B1 | 8/2009 | Montelo et al. |
| 7,613,886 B2 | 11/2009 | Yamazaki |
| 7,818,394 B1 | 10/2010 | Lawler et al. |
| 7,870,012 B2 | 1/2011 | Katz et al. |
| 7,966,369 B1 | 6/2011 | Briere et al. |

(Continued)

FOREIGN PATENT DOCUMENTS

WO   WO 2009058667 A1 * 5/2009 ....... G06F 17/30867

OTHER PUBLICATIONS

International Search Report and Written Opinion dated Apr. 2, 2013 for Application No. PCT/US2012/68740 (21 Pages).

(Continued)

*Primary Examiner* — Jonathan Bui (74) *Attorney, Agent, or Firm* — Nutter McClennen & Fish LLP; David J. Powsner; Michael P. Visconti, III (57) ABSTRACT

The invention provides in some aspects digital data processing systems and methods that match search objectives across user accounts. In one such aspect, such a system includes one or more digital data processors that limit access to data associated each of one or more users as a function of credentials, where that data includes information about the associated user, other persons and/or entities (such as, for example, businesses). Search functionality provided in such a system matches search objectives against data associated with multiple said users having different respective credentials to identify data meeting those objectives. And, that search functionality responds to identification of data meeting such an objective by notifying one or more users associated with that data.

15 Claims, 3 Drawing Sheets

(56) References Cited

U.S. PATENT DOCUMENTS

| | | |
|---|---|---|
| 8,073,867 B2 | 12/2011 | Chowdhury |
| 8,176,490 B1 | 5/2012 | Jackson |
| 2002/0059201 A1 | 5/2002 | Work |
| 2002/0138316 A1 | 9/2002 | Katz et al. |
| 2002/0174000 A1 | 11/2002 | Katz et al. |
| 2002/0178077 A1 | 11/2002 | Katz et al. |
| 2003/0018702 A1 | 1/2003 | Broughton et al. |
| 2003/0033179 A1 | 2/2003 | Katz et al. |
| 2003/0037263 A1 | 2/2003 | Kamat et al. |
| 2004/0252654 A1* | 12/2004 | Arnold ................... G06Q 20/40 370/310 |
| 2005/0283497 A1* | 12/2005 | Nurminen ............... G06Q 10/10 |
| 2006/0179255 A1* | 8/2006 | Yamazaki ..................... 711/147 |
| 2006/0277213 A1 | 12/2006 | Robertson et al. |
| 2007/0162450 A1* | 7/2007 | Siress ................... H04L 63/102 |
| 2007/0208743 A1 | 9/2007 | Sainaney |
| 2008/0034354 A1 | 2/2008 | Brughton et al. |
| 2008/0072239 A1 | 3/2008 | Liang et al. |
| 2008/0222125 A1* | 9/2008 | Chowdhury ...... G06F 17/30864 |
| 2008/0312959 A1 | 12/2008 | Rose et al. |
| 2008/0320486 A1 | 12/2008 | Bose et al. |
| 2009/0144120 A1 | 6/2009 | Ramachandran |
| 2009/0164447 A1 | 6/2009 | Daya |
| 2009/0171729 A1 | 7/2009 | Anisimov et al. |
| 2009/0307205 A1 | 12/2009 | Churchill et al. |
| 2010/0046842 A1 | 2/2010 | Conwell |
| 2010/0132044 A1* | 5/2010 | Kogan ................. G06F 21/6245 726/26 |
| 2010/0174709 A1* | 7/2010 | Hansen ................ G06F 17/3087 707/728 |
| 2010/0223211 A1 | 9/2010 | Johnson et al. |
| 2010/0241652 A1 | 9/2010 | Fasihuddin et al. |
| 2010/0274859 A1* | 10/2010 | Bucuk ..................... H04L 63/08 709/206 |
| 2011/0029367 A1 | 2/2011 | Olson et al. |
| 2011/0029430 A1 | 2/2011 | Norris et al. |
| 2011/0143731 A1* | 6/2011 | Ramer .................. G06Q 30/02 455/414.1 |
| 2011/0161319 A1 | 6/2011 | Chunilal |
| 2011/0289153 A1* | 11/2011 | Hull ..................... G06Q 10/107 709/205 |
| 2012/0005224 A1 | 1/2012 | Ahrens et al. |
| 2012/0185472 A1 | 7/2012 | Ahmed |
| 2012/0215848 A1 | 8/2012 | McCormick et al. |

OTHER PUBLICATIONS

**International Search Report and Written Opinion for Application No. PCT/US2012/20657 dated May 3, 2012.

U.S. Appl. No. 13/346,371, filed Jan. 9, 2012, Digital Data Processing Systems and Methods for Searching and Communicating Via a Social Network.

* cited by examiner

DIGITAL DATA PROCESSING SYSTEMS AND METHODS FOR SEARCHING ACROSS USER ACCOUNTS

This application is a continuation-in-part of U.S. patent application Ser. No. 13/346,371, filed Jan. 9, 2012, which claims the benefit of priority of U.S. Provisional Patent Application No. 61/443,679, filed Feb. 16, 2011, both entitled "Digital Data Processing Systems and Methods for Searching and Communicating via a Social Network," the teachings of both of which are incorporated by reference herein.

BACKGROUND OF THE INVENTION

The invention pertains to digital data processing and, more particularly, to methods and systems for matching search objectives across user accounts. The invention has application, by way of non-limiting example, in searching not only electronic bulletin boards (e.g., like Craig's List™) and online social networking sites across user accounts, but also in extending those searches to the computer desktop.

On account of online social networks, such as FaceBook™ and LinkedIn™ computer and mobile device users have become accustomed not only keeping up with regular contacts (e.g., family, friends and acquaintances) but also with family, friends and acquaintances of those contacts—or, put another way, with their contacts' contacts.

As noted in incorporated-by-reference U.S. Ser. No. 13/346,371, one appeal of such social networks is that they restrict the amount of information members may communicate and learn about each other based on their closeness or "connectedness." For example, members who have explicitly authorized it may message each other directly and/or view one another's postings (e.g., photographs, resumes, etc)—whereas members who are effectively strangers may be blocked from communicating or accessing any but the most public information about one another. While, somewhere in between are members who, though not directly connected (e.g., "friends" or "1st degree contacts," in the parlance), are indirectly connected via one or more intermediary members—such as in the case of contacts' contacts (or "friend's friends" or "2nd degree contacts"), contacts' contacts' contacts (or "friend's friends' friends" or "3rd degree contacts"), and so forth—between whom limited communications and information access may be available and for whom the online social network may facilitate electronic introductions, e.g., via intermediaries.

Among the most popular of the features of online social networks is the query, which permits members to search for other members based on objectives (or criteria), such as, name, current or former company affiliation, etc. Typically, online social networks limit application of those queries to information that the querying member might otherwise see in accord with his/her degrees of connectedness to other members. For example, a member's query for IBM programmers might net a list of friends and possibly, friends' friends, associated with the tech giant in that capacity. The length and potential utility of that list might be limited, however, if a key member is too far disconnected from the querying member to be uncovered by the search, given the network's access limitation protocol.

And, though as noted above, computer and mobile device users have become accustomed to keeping up with their extended contacts, online social networks do little to facilitate that outside the "walled garden" that is defined by each network's site or corresponding applications program interface (API). Thus, continuing the example above, if a close, real-life friend of the querying member knows an IBM programmer, the query will not reveal it, unless both the friend and the programmer are also members of the network. While the querying member might be tempted to use a traditional public search engine, such as Google or Yahoo!, these rarely reveal the connectedness of individuals. So, while a public engine search might uncover IBM programmers, it's statistically unlikely that any of them will be connected by less than six degrees (or so says conventional wisdom) to contacts of the querying member. Hence, the querying member may be relegated to the "old fashioned" way of getting a referral—contacting family, friends and acquaintances in person, via phone or email.

An object of the invention is to provide improved systems and methods for digital data processing.

A further object is to provide such systems and methods as facilitate queries (a/k/a searches or objectives) both within and outside online social networks.

Still another object is to provide such systems and methods as facilitate finding contacts and other information known to persons (and other entities) both within and outside the confines of a traditional online social network.

SUMMARY OF THE INVENTION

The foregoing are among the objects attained by the invention, which provides in some aspects, digital data processing systems and methods that match search objectives across user accounts. In one such aspect, such a system includes one or more digital data processors that limit access to data associated each of one or more users as a function of credentials, where that data includes information about the associated user, other persons and/or entities (such as, for example, businesses). Search functionality provided in such a system matches search objectives against data associated with multiple said users having different respective credentials to identify data meeting those objectives. And, that search functionality responds to identification of data meeting such an objective by notifying one or more users associated with that data.

By way of example, such a system can be an online social network (e.g., of the type that limits access to information based on member connectedness and on user credentials) executing on a server digital data processor that limits access to data associated each of one or more members as a function of their respective credentials. Those credentials can include, e.g., the members' respective logins (e.g., usernames and passwords) and/or their degree of connectedness to other members. The data can include information about the members themselves (including, for example, names, titles, affiliations, locales, contact information, and/or other attributes), about their jobs, about their financial and other assets. As well, it can include resumes, photographs, writings, and other documents and/or data generated by the members and/or their families, friends, acquaintances, contacts and/or others. And, it can include by further example, information identifying and/or about other members to whom they are connected and the degree of connectedness. The search functionality can match objectives (e.g., search terms) provided by a member or nonmember against the data of one or more of the (other) members of the social network. Upon identifying data meeting such an objective, that functionality can notify the user who is associated with that data—for example, inviting him or her to make it and/or related information available to the person who initiated the search and/or to contact that person.

By way of further example, such a system can comprise a plurality of digital data processors, e.g., interconnected in client/server, peer-to-peer and/or other relationships. One or more of those digital data processors can have user accounts, access to data on which is limited by the digital data processors in accord with their respective users' logins. That data can have originated locally to the respective digital data processors (as stored, for example, on physically or logically coupled storage devices, file servers or otherwise) as in the case, for example, of data maintained by users on their own respective digital data processors. Alternatively, or in addition, it can be data that was uploaded by users to their own respective accounts on a server digital data processor. The data can include information of the type which individuals and/or business entities normally (or not) maintain on personal computers, work computers or otherwise, e.g., resumes, photographs, writings, and other documents and/or data generated by them, information about the users themselves (including, for example, names, titles, affiliations, locales, contact information, and/or other attributes), about their jobs, about their financial and other assets and so forth, and/or information identifying and by or about their families, friends, acquaintances, contacts and/or others. Search functionality executing on a server or peer one of those digital data processors can match objectives (e.g., search terms) specified by a user against the data maintained in the accounts of other users on that and/or the other digital data processors. If there is a match, the search functionality can notify the respective user (i.e., the user associated with the matching data), e.g., inviting him or her to make the found and/or related information available to the person who initiated the query and/or to contact that person.

Further aspects of the invention provide systems, e.g., as described above, in which the search functionality discerns the search objectives from requests or profiles of users of one or more of the digital data processors. Those requests can be entered, for example, using a web interface, a special-purpose application, or otherwise. Alternatively, or in addition, the requests can be stored in files, registries, or other stores associated with the user accounts, e.g., on users' respective digital data processors and/or on a server digital data processor.

In related aspects of the invention, the search functionality of a system, e.g., as described above, can discern the search objectives from search engine logs. These can be for example, logs of public search engines, such as Google, Yahoo! and so forth. Alternatively, or in addition, they can be logs of a closed (private) or semi-closed (semi-private) search engine on a server or other one of the additional data processors.

Still other aspects of the invention provides systems, e.g., as described above, in which the search functionality transmits the "found" data i.e., data meeting the search objective to a source of the search objective, upon authorization of the user associated with that data. That "source" can comprise a search engine (e.g., private, semi private, or otherwise), a special-purpose application, or otherwise through which the search objectives were specified. Alternatively, or in addition, that source can be a person or other entity that specified the objectives.

Yet still further aspects of the invention provides systems, e.g., as described above, in which the search functionality responds to identification of one or more items of data that are associated with one of the user accounts (e.g., are local to one of the digital data processors) and that meet one or more search objectives) by prioritizing notifications to the user associated with that account (or respective digital data processor) in regard to such local data and/or such search objectives. Related aspects of the invention provide such systems in which the search functionality prioritizes those notifications as a function of one or more of (i) respective locales of the user and a source of the objectives, and (ii) connectedness in a social network (online or real-world) of that user and a source of the objectives.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
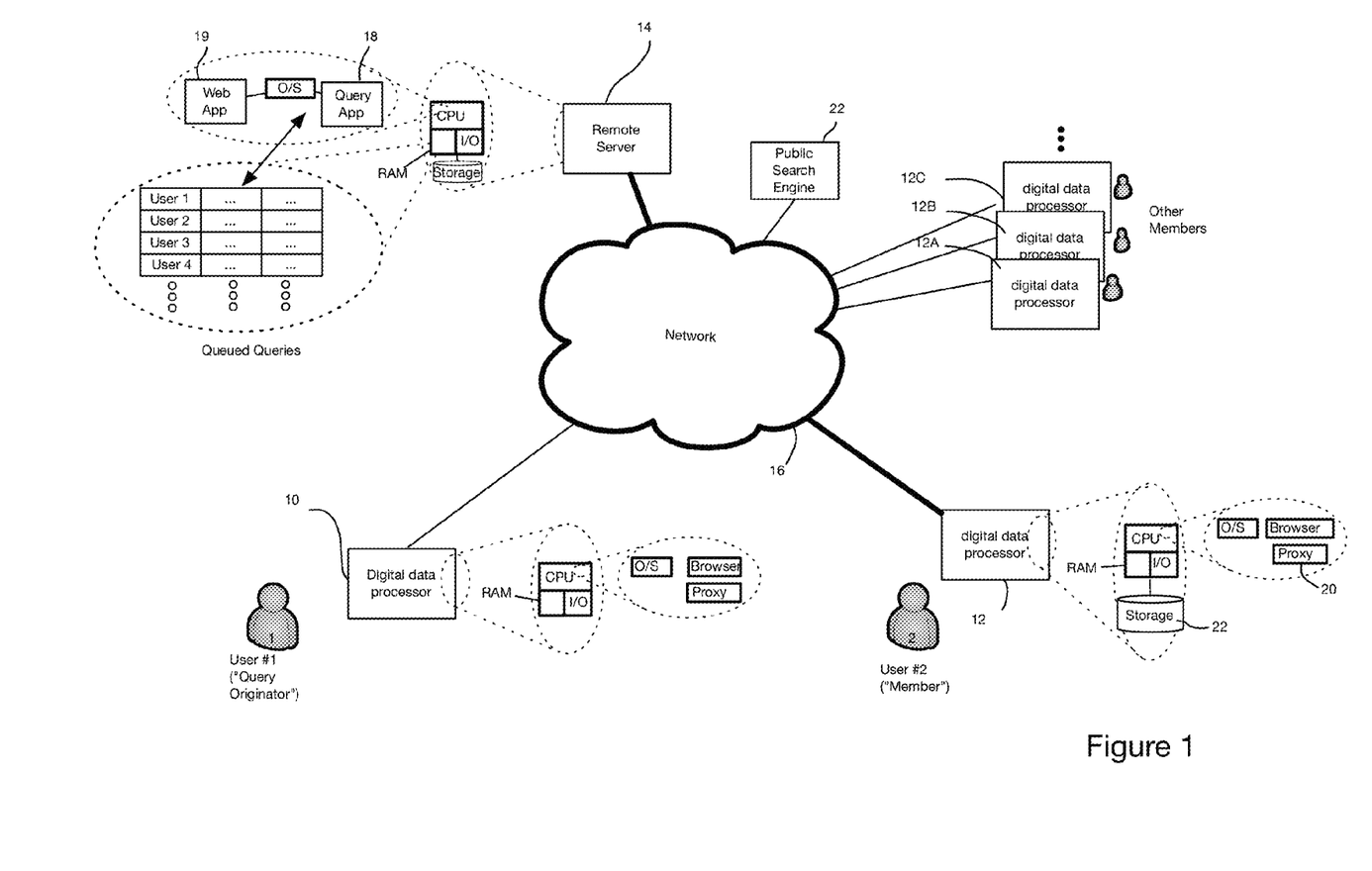
FIG. 1 depicts a system according to the invention and an environment in which it operates.

FIG. 1 depicts a system for matching search objectives across user accounts according to some practices of the invention. The illustrated system utilizes a client-server architecture, though it will be appreciated that other systems may employ peer-to-peer architectures or otherwise. Moreover, the discussion below largely focuses on embodiments in which queries specified by one user on his or her own client digital data processor are matched against (i) information contained in user accounts on other client digital data processors, as mediated by a server digital data processor and its proxies on those other client digital data processors, (ii) information contained in user accounts on a server digital data processor, as mediated by that (or another) server digital data processor. However, it will be appreciated that the teachings herein could likewise be applied under other scenarios and with respect to other system architectures.

The illustrated system includes digital data processors 10, 12, 12A-12C that are coupled to server 14 via network 16 and that comprise conventional computing devices of the type commercially available in the marketplace, such as laptop computers, desktop computers, workstations, and so forth, as adapted in accord with the teachings hereof. It will be appreciated that one or more of these could be mobile computing devices, e.g., smart phones, personal digital assistants (PDAs), and so forth, as adapted in accord with the teachings hereof. As well, they can be embedded computing devices as adapted in accord with the teachings hereof. Regardless, the digital data processors can transmit and/or receive information via wired or wireless communications, all in the conventional manner known in the art as adapted in accord with the teachings hereof.

For simplicity and without loss of generality, the users of digital data processors 10, 12 are sometimes referred to as User 1 and User 2, respectively though, in many of the examples given here, they are alternatively referred to as the "query originator" (or "searcher") and the "member," respectively. The latter term is used to reflect that, in many embodiments, user accounts being searched are likely to be members of an enterprise (e.g., a business, government or social organization), participants in a service, or otherwise, who have agreed to permit their user accounts (and, in embodiments of the sort illustrated here, digital data processors) searched in response to at least selected queries by the searcher, who may or may not be a such a member, participant, or so forth.

The drawing shows a plurality of other users, each associated with his or her own respective device 12A-12C constructed and operated similarly to device 12. A plurality of others "searchers," like that associated with device 10 could likewise be shown, but they are not, here, for sake of simplicity.

Illustrated devices, 10, 12, 12A-12C each include central processing unit (CPU), memory (RAM), and input/output (I/O) subsections of the type commonly incorporated in respective devices of the type discussed above. Those subsections may include and execute (particularly, for example, in the case of the CPU) an operating system, a web browser and/or other software of the type commonly provided and configured for execution on such devices again, as adapted in accord with the teachings hereof. Those subsections may, further, include and execute additional software effecting the functionality discussed below attributed to the respective devices 10, 12 such as query application proxy software 20, as shown.

The digital data processors, 10, 12, 12A-12C may include further displays (not shown) of the type commonly used in respective devices of the type discussed above, e.g., for the display of information in web browsers, applications, apps or otherwise. And, those devices 10, 12 can include keyboards (virtual, physical or otherwise) of the type commonly employed on such devices, e.g., for the input of information into web browsers, applications, apps or otherwise.

One or more of the devices 12, 12A-12C (and, optionally, device 10) may include "local" storage for containing the user or other data associated with that respective digital data processor. This is illustrated in the drawing, by way of example, by disk drive 22. Such a drive may be co-housed with the respective digital data processor, disposed in the vicinity of that respective digital data processor and/or on the same local area or other network and coupled by wire, wirelessly or otherwise, and/or may be disposed remotely and logically mounted on that digital data processor so that it functions as if a local drive for all intents and purposes relevant here, or otherwise.

Devices 12, 12A-12C (and, optionally, device 10) include or are otherwise coupled to security mechanisms, for example, of the type conventionally provided by their respective operating systems and/or by integral (or separately housed) firewalls or other functionality, that limit access to the respective devices—and, more particularly, for example, the data stored thereon—on the basis of credentials, e.g., specific to the users and/or the devices. Such credentials typically include usernames and passwords (or other such logins), but may also include session IDs, MAC addresses or other hardware-, software-, data- or user-specific codes, and so forth.

Server 14 oversees the matching of queries originated by device 10 with data in user accounts associated with devices 12, 12A-12C, either on those devices (as in the embodiments discussed in connection with FIG. 2) or on the server itself (as in the embodiments discussed in connection with FIG. 3). The server 14 comprises a conventional digital data processor of the type commercially available in the marketplace for use as a search engine or other servers, such as, personal computers, workstations, mini computers, mainframes, and so forth—all as adapted in accord with the teachings hereof. Server digital data processor 14, too, may include central processing unit (CPU), memory (RAM), and input/output (I/O) subsections of the type commonly incorporated in respective devices of the type described above. Those subsections may include and execute (particularly, for example, in the case of the CPU) an operating system (or software) of the type commonly provided and configured for execution on such device, again, as adapted in accord with the teachings hereof.

In the illustrated embodiment, those subsections include and execute additional software, e.g., query application 18, effecting the query (or "search") functionality discussed herein attributed to the respective server 14. Those subsections may include and execute still additional software, e.g., a web server 19, providing still other functions for client devices 10, 12, 12A-12C and/or the users thereof. In other embodiments, that functionality may be consolidated within or distributed among one or more other digital data processors (illustrated or otherwise) without deviating from the teachings hereof.

That web server software may include, by way of non-limiting example, a photo or other data sharing app; a job search app; a remote desktop app (e.g., OnLive Desktop, etc.); a search engine of the type described below in connection with element 22; an online social network of the type commercially available in the marketplace or otherwise (e.g., Facebook, LinkedIn, etc.); software that effects, in connection with such a commercially available online social network, a "collective" social network of the type effected by software application 210 disclosed in co-pending, commonly assigned U.S. patent application Ser. No. 13/346,371 (a copy of which is attached hereto as Appendix A), filed Jan. 9, 2012, at FIGS. 2-4 and the accompanying text thereof, by way of non-limiting example; and/or a combination of the foregoing; all by way of non-limiting example. In other embodiments, the functionality of web server software 19 may be consolidated within or distributed among one or more other digital data processors (illustrated or otherwise) without deviating from the teachings hereof.

Network 16 comprises a combination of one or more wireless, wired or other networks of the type commercially available in the marketplace for supporting at least intermittent communications between the illustrated devices (e.g., digital data processors 10, 12 and server 14) including, for example, LAN, WAN, MAN, cellular, Wi-Fi, local area, satellite, and/or other networks again, all as adapted in accord with the teachings hereof. Although only a single network 16 is shown in the drawing, it will be appreciated that in other embodiments multiple networks may be employed. One or more of those networks, e.g., local to the digital data processors 10, 12, 12A-12C may include firewalls or other security mechanisms that assist in limiting access to those digital data processors.

Illustrated search engine 22 comprises one or more search engines of the type known in the art and/or commercially available in the marketplace. These can include public search engines such as Google, Yahoo! and so forth, that apply queries against publicly accessible data maintained by servers throughout the world. These can also include semi-private and private search engines that restrict usage of search functionality to registered members and/or that conduct searches among segregated and/or specialized data stores (e.g., Craig's List, Monster.com, Lexus/Nexus, Morningstar, and so forth). Regardless of whether public, semi-private or private, the search engine(s) may include a log, API or other functionality providing access to searches being conducted (or previously conducted) utilizing that engine. For simplicity, such log, API or other functionality is referred to hereinafter as a search engine "log". And, as above, in other embodiments, the search engine functionality may be consolidated within or distributed among one or more other digital data processors (illustrated or otherwise) without deviating from the teachings hereof.

Applying Queries to Data Stored Locally to One or More Client Digital Data Processors Devices 10, 12, 12A-12C may be used in a variety of conventional ways in the normal course by their respective users. For sake of simplicity and without loss of generality, in the discussion as follows, device 10 is assumed to take the role of originating queries/searches of its respective user, while devices 12, 12A-12C are assumed to take the role of storing data of their respective users. Those latter devices, i.e., nos. 12, 12A-12C, are occasionally referred to herein as "client" digital data processors for convenience, though, as noted above, they may be employed in systems utilizing peer-to-peer or other architectures.

Thus, for example, client devices 12, 12A-12C of the illustrated embodiment are used in the normal course by their respective operators/users in the conventional manner of such devices (e.g., to store personal, business and/or other data, such as, for example, resumes, photographs, writings, and other documents and/or data generated by them, information about the users themselves (including, for example, names, titles, affiliations, locales, contact information, and/or other attributes), about their jobs, about their financial and other assets and so forth, and/or information identifying and by or about their families, friends, acquaintances, contacts and/or others (e.g., individuals, entities (such as business, organizations, places or things), or otherwise) albeit, as adapted in accord with the teachings hereof. Devices 12, 12A-12C may be used in other ways instead or in addition.

Device 10 may be used by its respective operator/user in the manner of devices 12, 12A 12C (as well, indeed, in the manner of devices 14 and 22). However, in the illustrated embodiment that device may used in the normal course in the conventional manner by its respective operator/user to originate queries to be applied by public, semi-private or private search engines 22 to data stored "on the web," in segregated and/or specialized data stores, and/or the like. (This is likewise true of devices 12, 12A-12C.) Regardless, those searches may be conducted utilizing web browsers and/or special-purpose applications or apps executing on the respective devices, again, in the normal course.

Figure 2:
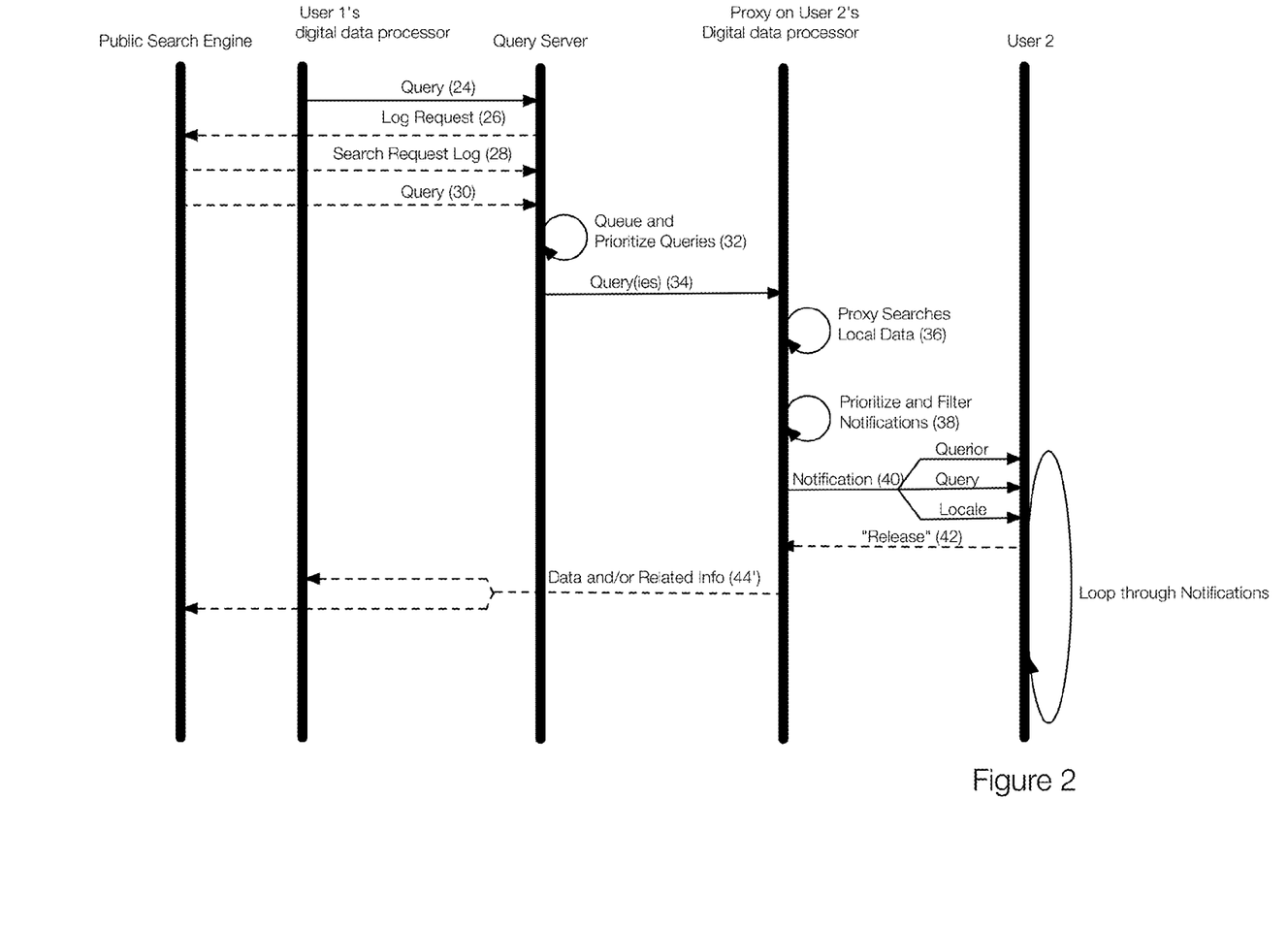
FIG. 2 depicts a process and dataflow to effect searching of username/password- or other credential-protected data maintained local to the client digital data processors in the system of FIG. 1.

In embodiments of the invention of the type illustrated in FIG. 2, one or more such queries originated by the user of device 10 may be applied by query application 18 to data stored in one or more of the client digital data processors 12, 12A-12C in accord with the teachings hereof that is, to data that is stored on or otherwise local (e.g., physically or logically) to those respective digital data processors, that is protected from access by usernames, passwords and/or other hardware-, software-, data-, user-specific or other credentials, and that is, therefore, not accessible or searchable by conventional public, private or semi-private search engines 22.

As shown in step 24, queries may be initiated by entry of search requests (a/k/a objectives) utilizing a web browser and/or special-purpose application or app executing on device 10 and specifically directed to query application 18 executing on server 14. Similarly, those queries may be from registries or other stores of search profiles maintained on device 10 and transmitted to query application 18 on server 14 by its proxy executing on device 10 or otherwise.

Alternatively or in addition, as shown in steps 26-28, those queries may constitute prior searches originated by device 10, stored to logs of search engine 22, requested by (step 26) and retrieved from those logs (step 28) by that application 18. Still further alternatively or in addition, as shown in step 30, they may be searches/queries directed by the user of device 10 (and/or the device 10 itself) to a public, semi-private for private search engine 22 and redirected by that device (or other functionality) to query application 18 and/or server 14. Such direction, transmission, requests and retrieval, or redirection, may be accomplished via web address, remote procedure calls, APIs executed by and between devices 10, 18 or otherwise.

In steps 32-34, the query application 18 queues and prioritizes queries and transmits them to the individual digital data processors 12, 12A-12C (referred to in the drawing as "member" digital data processors) for processing by them and, particularly, in the illustrated embodiment, by proxies of the query application executing respectively on them. These steps are shown in the drawing and discussed below with respect to device 12 for sake of simplicity and without loss of generality; they can be similarly performed on and with respect to the other devices 12A-12C.

Thus, in step 32, the query application 18 queues and prioritizes queries received in steps 24-30. This is performed, in some embodiments, to limit the resources required for transmission of those queries to the individual digital data processor 12 and/or the processing of those queries thereby. Such prioritization and queuing can be based on user account type, user account preferences, connectedness in a social network (e.g., as effected by web server software 19 or otherwise) of the users of devices 10 and 12, network bandwidth, processing capacity of device 12, likelihood of query match, and time of query receipt, to name but a few factors.

In step 34, the query application 18 transmits the prioritized and queued queries to device 12 and, specifically, in the illustrated embodiment to a proxy of the query application 18 executing on that device 12. These can be transmitted seriatim or in one or more batches. As above, this can be accomplished by web address, remote procedure calls, APIs executed by and between devices 12, 14 or otherwise. To avoid security mechanisms in place on digital data processor 12 and/or the network 16 on which it resides, such transmission can be to an authorized port on that device 12 and/or within that network 16, or it can be made by other mechanisms known in the art permitting communication, e.g., between a server and a secured client additional data processor.

In step 36, the proxy of query application 18 executing on digital data processor 12 searches personal, business or other data that is stored on or otherwise local (e.g., physically or logically) to that device 12 to find information matching the query(ies) received from application 18. Such matching can be performed in a manner known in the art of "desktop" searching (albeit, as adapted in accord with the teachings herein), e.g., fuzzy logic matching or otherwise. And, it can be based on indices that are pre-built by the proxy (or otherwise) and/or based on a brute force search of the local data.

In step 38, the proxy filters and prioritizes potential notifications to the user of device 12 of matches found in step 36. This is performed, in some embodiments, to limit unnecessary or excessive notifications to the operator/user of device 12. Such filtering and prioritization can be based on the same factors such as user account preferences, connectedness in a social network (e.g., as effected by web server software 19 or otherwise) of the user of device from which the query originated (here, device 10) and the user of the device against which the query was applied (here, device 12), time of query receipt, to name but a few factor.

In steps 40-44, the proxy notifies the user of device 12 of at least selected queries that favorably matched his/her associated local data and, depending on his/her response, transmits that data or related information back to the source of the query via the server 14 and query application 18. These steps are shown in the drawing and discussed below with respect to a single notification for sake of simplicity and without loss of generality; they can be similarly performed on and with respect to the other notifications.

Thus, in step 40, the proxy transmits the filtered and prioritized notifications to the user of device 12. This can be done via desktop notification, via email, text message or otherwise. These can be transmitted seriatim or in one or more batches. The format and content of the notifications can be based on user account preferences, available information regarding matching queries, and so forth. By way of example, such notifications can include identification of the source of the query (e.g., the name or ID of the user of device 10 and/or of a search engine from which the query was obtained and/or other actual or estimated locale of that user and or engine, all by way of example), the substance or content of the query, the substance or content of the data associated with the user of device 12 that matched the query, all by way of non-limiting example.

In step 42, the proxy receives from the user of device 12 an indication of which notifications to which he/she wishes to respond. This can be signaled by the user via keyboard, mouse, other input device, text message, email or other indication.

In step 44, the proxy transmits data matching a query (or related information, such as, for example, a user ID, email address, web address, or other identifying information regarding the user associated with the matching data, all by where example) back to the server 14 and query application 18 for transmittal to a source of the query, e.g., user of device 10, a search engine from which the query was obtained, and/or a special-purpose application or otherwise through which the search objectives were specified. In some embodiments, the proxy can transmit that data (or related information) directly to the source, e.g., in instances where the query initially transmitted by the query application 18 to the proxy includes sufficient source-identifying information (such as, user ID, email address, web address, and so forth, all by where example). Regardless, the data or related information transfer can be accomplished by web address, remote procedure calls, APIs executed by and between the respective devices, or otherwise. Indeed, in some embodiments, the proxy does not transmit such information relying, instead, on the user of device 12 to make any necessary or desired contacts with the query source based on information supplied in the notification, such as, user ID, email address, web address, user name, phone number, etc.

In step 44, the query application 18 can utilize information supplied by the proxy to build a social network managed by web server software 19. Particularly, for example, the query application 18 can pass on to web server software 19 information regarding identities of the source of the query (e.g., the identity of the user of device 10) and of the user associated with the account with data matching that search (e.g., the identity of the user of device 12). The Web server software 19 can utilize that information to establish a first- or other-order link between those members of the social network.

Applying Queries to User Accounts on Server Digital Data Processor

In some embodiments, server 14 takes the (additional) role of storing data of users in respective accounts maintained by that server, e.g., in connection with operation of the web server software 19 or otherwise. As above, this can be business, personal and other data of the users (e.g., resumes, photographs, writings, and other documents and/or data generated by them, information about the users themselves (including, for example, names, titles, affiliations, locales, contact information, and/or other attributes), about their jobs, about their financial and other assets and so forth, and/or information identifying and by or about their families, friends, acquaintances, contacts and/or others—e.g., individuals, entities or otherwise), and it can include data uploaded by the users (or otherwise) from their respective devices 12, 12A-12C. However, it can also be data created and/or uploaded in the first instance by those users with the assistance of their respective digital data processors 12, 12A-12C (or otherwise) while logged in or otherwise in communications with the server 14—and, particularly, for example, with the web server software 19. Still further, it may be data created by and/or transferred to the respective user accounts, e.g., in connection with the operation of web server software 19 or otherwise, by other functionality executing on or in connection with the server 14 and/or third parties (and/or their respective devices).

Regardless of its source, the data of the respective users may be stored by sever 14 in physical or logical storage (e.g., of the type discussed above in connection with devices 12, 12A-12C) that is "local" to the server. While in many cases, this may include disk drives that are physically or logically coupled to device 14, in other cases it may include server farms and/or "cloud" storage utilizing devices that are geographically distributed within a building, campus, or otherwise. Still further, as with devices 12, 12A-12C, server 14 includes or is otherwise coupled to security mechanisms, such as, for example, of the type conventionally provided by its respective operating system, web server software 19 and/or by integral (or separately housed) firewalls or other functionality, that limit access to that user data on the basis of credentials, e.g., specific to the users. Such credentials typically include usernames and passwords, but (as above) may also include session IDs, MAC addresses or other hardware-, software-, data- or user-specific codes, and so forth.

Figure 3:
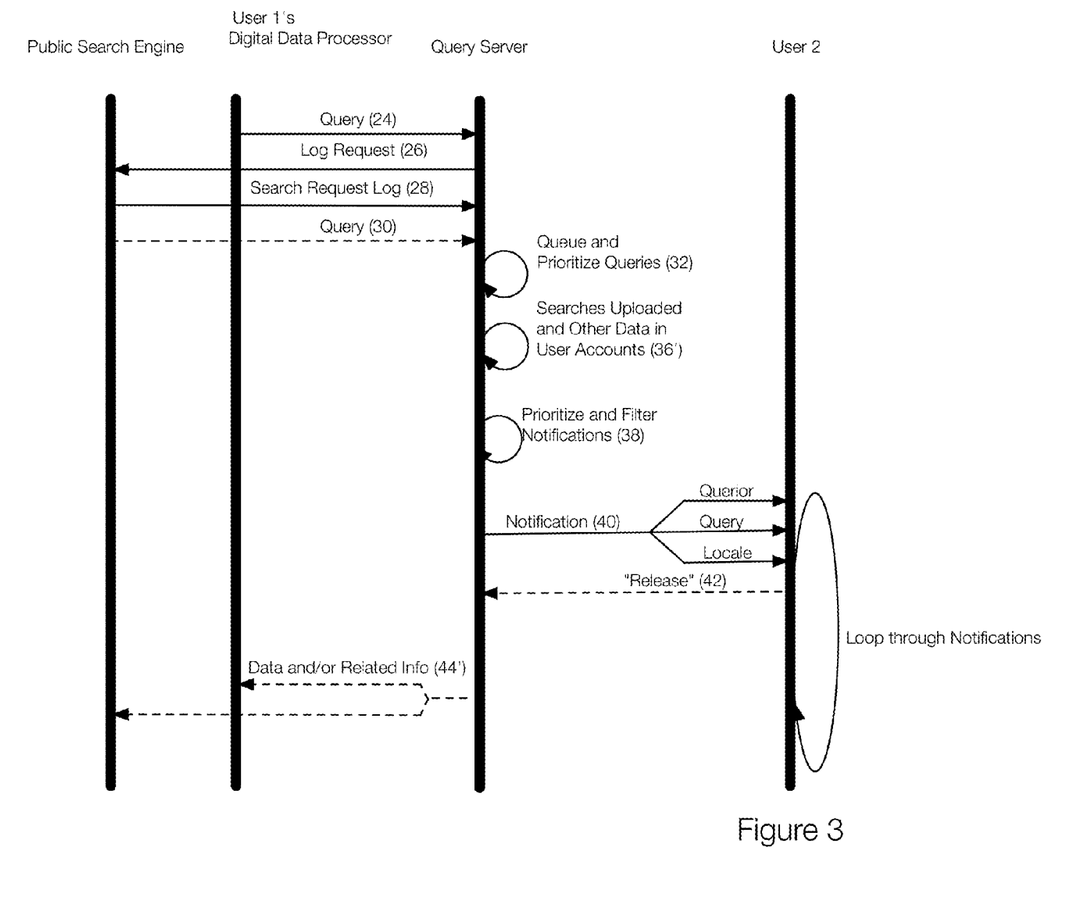
FIG. 3 depicts a process and dataflow to effect searching of username/password- or other credential-protected data maintained in user accounts of a server digital data processor in the system of FIG. 1.

In embodiments of the invention of the type illustrated in FIG. 3, one or more queries originated by the user of device 10 may be applied by query application 18 to data stored in one or more of the user accounts on server 14 in accord with the teachings hereof—e.g., data that is associated with web server software 19 (or otherwise) and that is protected from access by usernames, passwords and/or other hardware-, software-, data-, user-specific or other credentials, and that is, therefore, not accessible or searchable by conventional public, private or semi-private search engines 22. The process and dataflow of these embodiments parallels that of the embodiments shown in FIG. 2, as indicated by use of like reference numbers in those drawings. Distinctions are noted below.

Thus, for example, as shown in steps 24-30 of FIG. 3 (like that of FIG. 2), queries may be conducted utilizing a web browser and/or special-purpose application or app executing on device 10 and specifically directed to query application 18; may be from registries or other stores of search profiles maintained on device 10; may constitute prior searches originated by device 10; may be searches/queries directed by the user of device 10 (and/or the device 10 itself) to a search engine 22 and redirected by that device (or other functionality) to query application 18 and/or server 14; or otherwise.

In steps 32-38 of FIG. 3, the query application 18 queues and prioritizes queries, processes them by applying them against data in the respective user accounts, and generates notifications to those users in instances where there are matches. These steps are shown in the drawing and discussed below with respect to the account of a single user (i.e., the user of device 12) for sake of simplicity and without loss of generality; however, they can be similarly performed on and with respect to accounts of other users (i.e., those associated with devices 12A-12C).

Thus, in step 32 of FIG. 3 (like that of FIG. 2), the query application 18 queues and prioritizes queries received in steps 24-30. This is performed in the embodiment of FIG. 3, for example, to limit the resources required for processing of those queries by server 14. Similar to above, such prioritization and queuing can be based on user account type, user account preferences, connectedness in a social network (e.g., as effected by web server software 19 or otherwise) of the users of devices 10 and 12, network bandwidth, processing capacity of device 14, likelihood of query match, and time of query receipt, to name but a few factors.

In step 36', the query application 18, searches personal, business or other data that is stored in the respective user accounts (e.g., utilizing credentials contained for each such account within or otherwise associated with web server software, the server 14 operating system, or otherwise, to access that data) to find information matching the query(ies). Such matching can be performed in a manner known in the art of "desktop" searching (albeit, as adapted in accord with the teachings herein), e.g., fuzzy logic matching or otherwise. And, it can be based on indices that are pre-built by the web server, the query application (or otherwise) and/or based on a brute force search of the user accounts.

In step 38, the query application filters and prioritizes potential notifications to the account users of matches found in step 36'. As above, this is performed, in some embodiments, to limit unnecessary or excessive notifications to the users. Such filtering prioritization can be based on the same factors such as user account preferences, connectedness in a social network (e.g., as effected by web server software 19 or otherwise) of the user of device from which the query originated (here, device 10) and the user associated with the account against which the query was applied (here, device 12), time of query receipt, to name but a few.

In steps 40-44', the query application 18 notifies the user of device 12 of at least selected queries that favorably matched his/her associated local data and, depending on his/her response, transmits that data or related information back to the source of the query via the server 14 and query application 18. These steps are shown in the drawing and discussed below with respect to a single notification for sake of simplicity and without loss of generality; they can be similarly performed on and with respect to the other notifications.

Thus, in step 40, the query application 18 transmits the filtered and prioritized notifications to the user of device 12. This can be done via the proxy executing on that device, or otherwise, and can be accomplished using desktop notification, email, text message or otherwise. The notifications can be transmitted seriatim or in one or more batches. The format and content of the notifications can be based on user account preferences, available information regarding matching queries, and so forth. By way of example, such notifications can include identification of the source of the query (e.g., the name or ID of the user of device 10 and/or of a search engine from which the query was obtained and/or other actual or estimated locale of that user and or engine, all by way of example), the substance or content of the query, the substance or content of the data associated with the user of device 12 that matched the query, all by way of non-limiting example.

In step 42, the query application receives from the user of device 12, via its proxy executing on that device or otherwise, an indication of which notifications to which he/she wishes to respond. This can be signaled by the user via keyboard, mouse, other input device, text message, email or other indication.

In step 44', the query application 18 transmits data matching a query (or related information, such as, for example, a user ID, email address, web address, or other identifying information regarding the user associated with the matching data, all by where example) back to to a source of the query, e.g., a user of device 10, a search engine from which the query was obtained, and/or a special-purpose application or otherwise through which the search objectives were specified. In some embodiments, the query application 18 can transmit that data (or related information) directly to the source, e.g., in instances where the query initially received by the query application 18 includes sufficient source-identifying information (such as, user ID, email address, web address, and so forth, all but where example). Regardless, the data or related information transfer can be accomplished by web address, remote procedure calls, APIs executed by and between the respective devices, or otherwise. Indeed, in some embodiments, the query application 18 does not transmit such information—relying, instead, on the user of device 12 to make any necessary or desired contacts with the query source based on information supplied in the notification, such as, user ID, email address, web address, user name, phone number, etc.

Described above our systems and methods meeting the objects set forth earlier, among others. Of course, it will be appreciated that embodiments shown and described here are merely examples of the invention, and that other embodiments fall within the scope of the invention as well. Thus, for example, it will be appreciated that while the users of the digital data processors 10, 12, 12A-12C may be individuals, they may as well be enterprises or other entities. Thus, for example, the user of querying device 10 may be a corporation that runs automated, batched, or other searches from a "headless" workstation 10 disposed in the bowels of the corporate IT department. And, likewise, by way of further example, the user of a queried device 12 may be a governmental organization that stores its documents and other data on a single computer 12 commonly used by the staff of that organization.

In view of the foregoing, what is claimed is:

1. A digital data processing system for matching search objectives across user accounts, comprising:
   A. one or more digital data processors that limit access to data associated with each of one or more users as a function of credentials of those respective users, each of the one or more digital data processors including a central processing unit (CPU) and a memory, the one or more digital data processors including a first user's digital data processor and a query server,
      wherein the first user's digital data processor transmits a search objective specified by a first user to the query server;
   B. search functionality executing on the query server that matches that same search objective specified by the first user in a search request against (a) public and other data accessible to the first user (collectively, "accessible data") and (b) data that is associated with one or more other users and that is not accessible by the first user (collectively, "inaccessible data"), the inaccessible data being (a) local to a plurality of respective digital data processors, each of the plurality of respective digital data processors being associated with a respective single one of said one or more other users and each of the plurality of respective digital data processors being distinct from the first user's digital data processor and from the query server, and (b) searched by proxies executing locally on said plurality of respective digital data processors, and C. the search functionality responding to identification of inaccessible data meeting said search objective by sending a notification to one or more users associated with that data;

wherein said notification includes an identity of the first user, the content of the search objective, and the content of the inaccessible data that met the search objective;

wherein the search functionality prioritizes multiple such notifications as a function of one or more of (i) geographic sources of the respective search objectives, and (ii) connectedness in a social network between the one or more users to whom the notification is sent and one or more first users that specified the respective search objectives; and wherein upon authorization of a user associated with inaccessible data that meets a search objective, the search functionality transmits that data to the first user.

2. The digital data processing system of claim 1, wherein the data associated with each user includes information about the associated user, other persons or entities.

3. The digital data processing system of claim 2, wherein the data associated with each user includes information regarding family, friends, acquaintances, or other contacts of a said user.

4. The digital data processing system of claim 2, wherein the entities include any of businesses, organizations, places or things.

5. The digital data processing system of claim 1, wherein the search functionality discerns the search objective from a request or a profile of the first user.

6. The digital data processing system of claim 1, wherein the search functionality discerns the search objective from a search engine log associated with the first user.

7. A digital data processing system for matching search objectives across user accounts, comprising:

A. one or more digital data processors that limit access to data associated with each of one or more users as a function of credentials of those respective users, each of the one or more digital data processors including a central processing unit (CPU) and a memory, the one or more digital data processors including a first user's digital data processor and a query server, wherein the first user's digital data processor transmits a search objective specified by a first user to the query server, B. search functionality executing on the query server that matches that same search objective specified by the first user in a search request against (a) public and other data accessible to the first user (collectively, "accessible data") and (b) data that is associated with one or more other users and that is not accessible by the first user (collectively, "inaccessible data"), said matching being performed in response to that same search request, and C. the search functionality responding to identification of inaccessible data meeting said search objective by sending a notification to one or more users associated with that data, and D. wherein the inaccessible data comprises information uploaded to a first said digital data processor from one or more second said digital data processors, wherein said notification includes an identity of the first user, the content of the search objective, and the content of the inaccessible data that met the search objective;

wherein the search functionality prioritizes multiple such notifications as a function of one or more of (i) geographic sources of the respective search objectives, and (ii) connectedness in a social network between the one or more users to whom the notification is sent and one or more first users that specified the respective search objectives; and wherein upon authorization of a user associated with inaccessible data that meets a search objective, the search functionality transmits that data to the first user.

8. The digital data processing system of claim 7, wherein the credentials comprise any of logins associated with any of users and administrators of the second digital data processors.

9. The digital data processing system of claim 7, wherein the data includes information about a said associated user, other persons or entities.

10. The digital data processing system of claim 9, wherein the entities include any of businesses, organizations, places or things.

11. The digital data processing system of claim 7, wherein the search functionality discerns the search objective from a request or a profile of the first user.

12. The digital data processing system of claim 7, wherein the search functionality discerns the search objective from a search engine log associated with the first user.

13. The digital data processing system of claim 7, wherein the notification includes a geographic source of the objective.

14. The digital data processing system of claim 7, wherein the notification includes an identity of a person or entity about which the data meeting the objective concerns.

15. The digital data processing system of claim 7, wherein the search functionality builds a social network based on the first user.

* * * * *